US009317489B2

(12) United States Patent
Antipa (10) Patent No.: US 9,317,489 B2
(45) Date of Patent: Apr. 19, 2016

(54) VECTOR GRAPHIC CONVERSION INTO FONTS

(71) Applicant: Adobe Systems Incorporated, San Jose, CA (US)

(72) Inventor: Damien M. Antipa, Saint-Louis (FR)

(73) Assignee: Adobe Systems Incorporated, San Jose, CA (US)

( * ) Notice: Subject to any disclaimer, the term of this patent is extended or adjusted under 35 U.S.C. 154(b) by 296 days.

(21) Appl. No.: 13/929,561

(22) Filed: Jun. 27, 2013

(65) Prior Publication Data

US 2015/0007021 A1  Jan. 1, 2015

(51) Int. Cl.
*G06F 17/00* (2006.01)
*G06F 17/22* (2006.01)
*G06F 17/21* (2006.01)

(52) U.S. Cl.
CPC .......... *G06F 17/2247* (2013.01); *G06F 17/214* (2013.01)

(58) Field of Classification Search
CPC ............................ G06F 17/2247; G06F 17/214
See application file for complete search history.

(56) References Cited

U.S. PATENT DOCUMENTS

| | | | |
|---|---|---|---|
| 5,309,548 A * | 5/1994 | Ohta et al. ............ | 358/1.9 |
| 5,577,183 A | 11/1996 | Weyand | |
| 5,583,978 A | 12/1996 | Collins et al. | |
| 5,710,880 A | 1/1998 | Howlett et al. | |
| 6,661,417 B1 | 12/2003 | Cheng | |
| 6,760,029 B1 | 7/2004 | Phinney et al. | |
| 6,771,267 B1 | 8/2004 | Muller | |
| 6,803,913 B1 * | 10/2004 | Fushiki et al. ................ | 345/467 |
| 6,992,671 B1 | 1/2006 | Corona | |
| 7,251,365 B2 | 7/2007 | Fux et al. | |
| 7,418,652 B2 * | 8/2008 | Ornstein et al. ............ | 715/200 |
| 7,535,471 B1 * | 5/2009 | Mansfield ..................... | 345/467 |
| 7,549,118 B2 * | 6/2009 | Shur et al. .................... | 715/234 |
| 7,895,513 B1 * | 2/2011 | Puri et al. .................... | 715/234 |
| 8,466,920 B2 * | 6/2013 | Lee et al. ..................... | 345/441 |
| 8,830,241 B1 * | 9/2014 | Gorner ......................... | 345/467 |
| 2005/0050474 A1 | 3/2005 | Bells et al. | |
| 2006/0005114 A1 * | 1/2006 | Williamson et al. .......... | 715/502 |

(Continued)

FOREIGN PATENT DOCUMENTS

| | | |
|---|---|---|
| CN | 1710534 | 12/2005 |
| CN | 102609961 | 7/2012 |
| EP | 1840838 | 10/2007 |
| EP | 1906358 | 4/2008 |
| KR | 20050064113 | 6/2005 |

OTHER PUBLICATIONS

Private-Use Characters, Noncharacters & Sentinels FAQ, retrieved on Jun. 12, 2015 from archive.org capture on Mar. 8, 2013, 9 pages.*

(Continued)

*Primary Examiner* — Scott Baderman
*Assistant Examiner* — Barbara Level
(74) *Attorney, Agent, or Firm* — Wolfe-SBMC (57) ABSTRACT

Techniques are described to convert vector graphics into fonts. In one or more implementations, web content is received that includes one or more vector graphics. Each of the one or more vector graphics are flattened to form a path that describes a corresponding image of a respective vector graphic. A font file is formed that includes, for each path, a glyph and an identifier that is usable to identify the glyph. A stylesheet file is also created having a class that corresponds to the glyph and corresponding identifier.

20 Claims, 10 Drawing Sheets

(56) References Cited

U.S. PATENT DOCUMENTS

| | | | |
|---|---|---|---|
| 2006/0017733 A1* | 1/2006 | Matskewich et al. | 345/467 |
| 2008/0168135 A1* | 7/2008 | Redlich et al. | 709/204 |
| 2008/0201328 A1* | 8/2008 | Da Silva et al. | 707/6 |
| 2010/0149181 A1* | 6/2010 | Lee et al. | 345/423 |
| 2010/0211883 A1* | 8/2010 | Lee et al. | 715/740 |
| 2010/0271404 A1* | 10/2010 | Marr | 345/667 |
| 2011/0090230 A1 | 4/2011 | Bacus et al. | |
| 2011/0258535 A1* | 10/2011 | Adler et al. | 715/235 |
| 2011/0285711 A1* | 11/2011 | Kilgard | 345/426 |
| 2012/0079374 A1* | 3/2012 | Gaddis | 715/269 |
| 2014/0300604 A1* | 10/2014 | Pimmel | 345/440 |

OTHER PUBLICATIONS

"Fonts", Retrieved from <http://www.w3.org/TR/SVG/fonts.html> on Mar. 22, 2013, (Aug. 16, 2011), 22 pages.

"Scalable Vector Graphics (SVG) 1.1 (Second Edition)", Retrieved from <http://www.w3.org/TR/SVG/> on Mar. 22, 2013, (Aug. 16, 2011), 4 Pages.

"ScanFont", Retrieved from <http://www.fontlab.com/font-converter/scanfont/> on Mar. 22, 2013, (Nov. 2007), 3 pages.

* cited by examiner

VECTOR GRAPHIC CONVERSION INTO FONTS

BACKGROUND

There is an ever increasing amount of web content made available via the Internet for consumption by a browser, a web-enabled application, and so on. Developers may employ a variety of different techniques to compose and deploy this web content for consumption by users.

However, conventional techniques that are available to developers did not adequately address a transition between composing the web content and deployment of the content. Further, these techniques may result in inefficient processing of images, which could also result in inefficiencies in the consumption of images, such as be a computing device.

For example, conventional techniques could result in a variety of different image types that could consume a large amount of resources to store the images as well as render the images. Accordingly, these conventional techniques could be frustrating and time consuming to developers, which could result in web content that could be difficult to consume by devices with limited resources, such as mobile communications devices.

SUMMARY

Techniques are described to convert vector graphics into fonts. In one or more implementations, web content is received that includes one or more vector graphics. Each of the one or more vector graphics are flattened to form a path that describes a corresponding image of a respective vector graphic. A font file is formed that includes, for each path, a glyph and an identifier that is usable to identify the glyph. A stylesheet file is also created having a class that corresponds to the glyph and corresponding identifier.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Conventional techniques that are utilized to generate content packages are often limited in support of transitions between developing the web content and generating a package that includes the web content. Further, these techniques could be limited in how images are addressed. Accordingly, conventional techniques may rely on a variety of different manual processes, which could be frustrating to developers of web content that wish to leverage the content packages.

Content package generation techniques for web content are described. In one or more implementations, an automated system is described that may operate without user intervention to generate a content package. For example, a user may interact with an authoring tool to compose a web content project, such as in accordance with a LESS dynamic stylesheet language. The system may then be utilized to process the web content project into a content package, which may be configured for consumption via a content repository application programming interface (API).

For example, a user may provide one or more user inputs to initiate processing of the web content project (e.g., a command, gesture, use of a cursor control device, and so on) into a content package that is configured for consumption via a content repository API for Java® (JCR). This processing may include converting the web content project from a LESS configuration to a cascading style sheets (CSS) configuration, verification of syntax, processing of images if included, performing unit test cases, extracting inline documentation, taking portions of the web content project into corresponding locations in a hierarchical structure of the content package, installation on an executing content management system, and so on. In this way, the system may be utilized to package the web content as tested and verified automatically and without user intervention, thereby increasing a likelihood that these actions will be undertaken by a developer of the web content. Further discussion of these techniques may be found in the discussion of FIGS. 2-5.

Additionally, techniques are described which may be utilized to improve processing and rendering of images as part of web content. For example, techniques may be employed to process vector images included in web content into glyphs.

This may include flattening of a textual description of the vector graphics to describe the corresponding images as a path of waypoints. These waypoints may then be stored with identifiers as glyphs in a single font file with a corresponding stylesheet as part of the web content. In this way, images described by the vector graphics may be treated as glyphs for use as part of the web content, which may improve resource utilization as part of the generation and consumption of the web content. Further discussion of these techniques may be found of the description of FIGS. 6-9.

In the following discussion, an example environment is first described that may employ the techniques described herein. An implementation example of web content development and an implementation example of vector graphic processing are then described in corresponding sections. These sections include example procedures, which may be performed in the example environment as well as other environments. Consequently, performance of the example procedures is not limited to the example environment and the example environment is not limited to performance of the example procedures.

Example Environment

Figure 1:
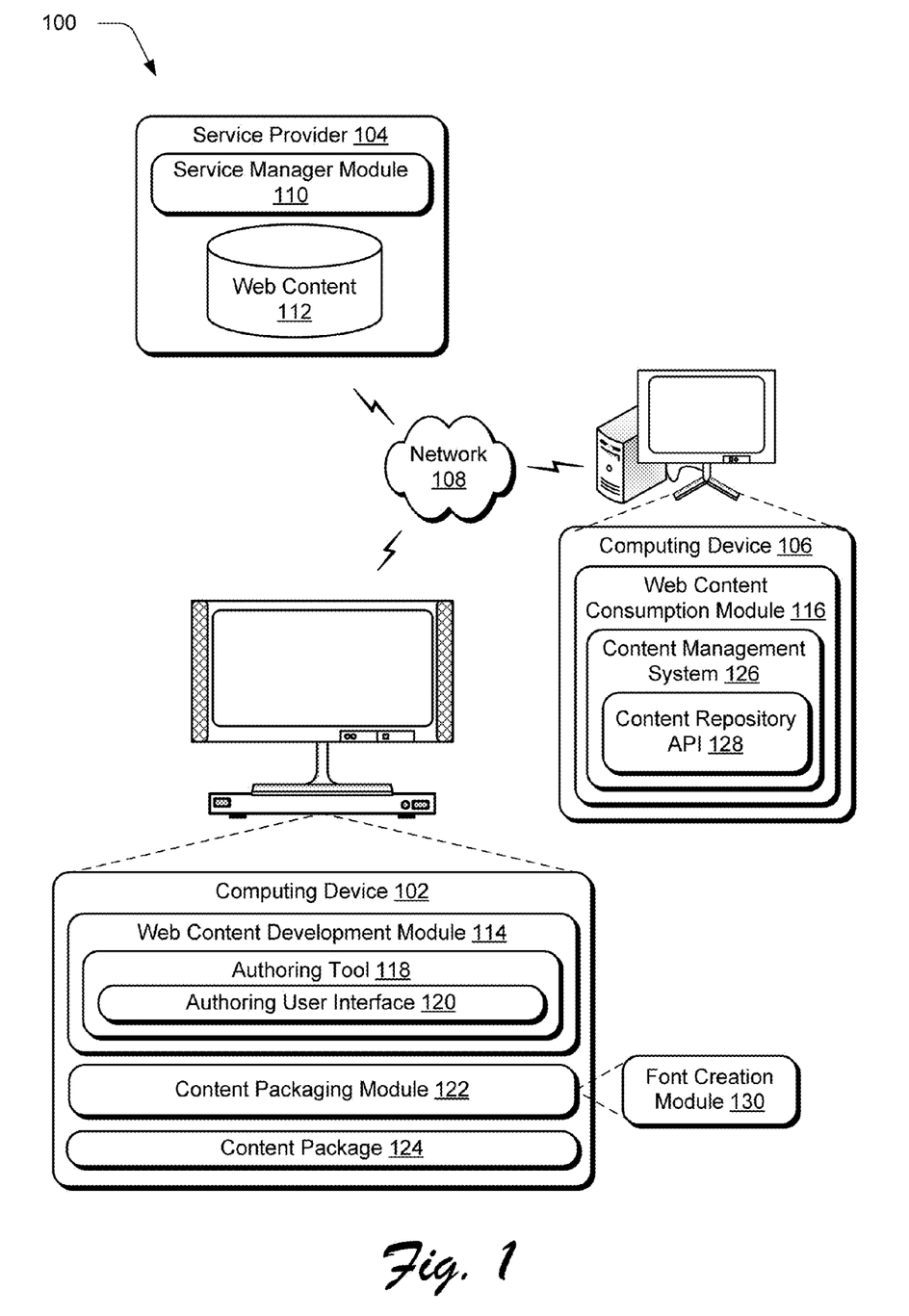
FIG. 1 is an illustration of an environment in an example implementation that is operable to employ techniques described herein.

FIG. 1 is an illustration of an environment 100 in an example implementation that is operable to employ techniques described herein. The illustrated environment 100 includes a computing device 102, a service provider 104, and another computing device 106 that are communicative coupled via a network 108. The computing devices 102, 106, as well as the computing devices that implement the service provider 104, may be configured in a variety of ways.

A computing device, for instance, may be configured as a desktop computer, a laptop computer, a mobile device (e.g., assuming a handheld configuration such as a tablet or mobile phone), and so forth. Thus, computing devices may range from full resource devices with substantial memory and processor resources (e.g., personal computers, game consoles) to a low-resource device with limited memory and/or processing resources (e.g., mobile devices). Additionally, although a single computing device may be described in the following, reference to a computing device may be representative of a plurality of different devices, such as multiple servers utilized by a business (e.g., the service provider 104) to perform operations "over the cloud" as further described in relation to FIG. 10.

Although the network 108 is illustrated as the Internet, the network may assume a wide variety of configurations. For example, the network 106 may include a wide area network (WAN), a local area network (LAN), a wireless network, a public telephone network, an intranet, and so on. Further, although a single network 108 is shown, the network 108 may also be configured to include multiple networks.

The service provider 104 is illustrated as including a service manager module 110. The service manager module 110 is representative of functionality of the service provider 104 to manage web content 112 as part of one or more network-based services. The web content 112 may be configured in a variety of ways, such as one or more webpages of a website, configured for access as part of a network-based application, and so on.

In the illustrated environment, the computing device 102 includes a web content development module 114 that is representative of functionality to compose the web content 112, e.g., for use by a developer. Computing device 106, on the other hand, is illustrated as including a web content consumption module 116 that is representative of functionality to consume the web content 112, e.g., as a browser, as part of a network-based application, and so on. Although illustrated separately, it should be readily apparent that the represented functionality may be combined on a single computing device (e.g., computing device 102 may be used to both develop and consume the content), may be further distributed (e.g., as part of a network service), and so on.

The web content developer module 114 is illustrated as including an authoring tool 118 that is executable to provide a user interface via which a developer may compose the web content 112. As such, the authoring tool 118 may be configured in a variety of different ways. For example, the authoring tool 118 may be configured to support a style sheet language to describe presentation of a web content project in a markup language, such as XML and so on.

A content packaging module 122 is also illustrated, which is representative of functionality that may be employed to package a web content project as a content package 124, e.g., the web content project received from the authoring tool 118 or elsewhere. The content packaging module 122, for instance, may configure the web content project in accordance with a hierarchical (e.g., tree-like) structure having a plurality of nodes with associated properties. Thus, a parent/child relationship of the nodes may also define a relationship of content associated with the nodes. In this way, the structure of the content package 124 may specify how content of the content package 124 is to be accessed.

As previously described, the computing device 106 includes a web content consumption module 116 that is representative of functionality to consume web content 112, which may include the content package 124 that was communicated for distribution via the network 108 by the service provider 104. The web content consumption module 116 includes a content management system 126 (CMS) having a content repository API 128. The content repository API 128 may be configured to follow a specification for access to the content package 124, such as in accordance with a content repository API for Java® (JCR) or other dynamic runtime language. The content management system 126 may thus be used to maintain and manage content associated with the content package 124 as well as content received via other techniques (e.g., as single files) via the content repository API 128, which may include versioning metadata and so on.

Thus, the content management system 126 may operate as a type of object database to store, search, and retrieve hierarchical content. As such, the content package 124 may also be configured by the content packaging module 122 in accordance with this database, such that a hierarchical structure of the content package 124 is configured in accordance with the hierarchical structure of the object database maintained by the content management system 126.

As previously described, conventional techniques that were utilized to generate a content package 124 did not support a transition between development of the content and building of the content package 124. This could cause developers to forgo use of testing and verification to make sure the web content "functions as intended." However, the content packaging module 122 may perform operations associated with this transition automatically and without user intervention, such as through configuration as a configurable build system that aggregates several tools into a single configuration that provides a simple, configurable, and intuitive way to build a fully-tested content package 124.

A variety of different functionality may be incorporated as part of the building of the content package 124. An example of such functionality is illustrated as a font creation module 130. The font creation module 130 is representative of functionality to convert vector graphics of a web content project into glyphs. In this way, the font file may provide an efficient technique for display of corresponding images as part of the web content, further discussion of which may be found beginning in relation to the description of FIG. 5.

Content Package Generation

The following discussion describes content package generation techniques that may be implemented utilizing corresponding systems and devices, as well as other systems and devices. Further, the systems and devices may also be utilized to perform other procedures and arrangements thereof. Aspects of the procedure of FIG. 5 may be implemented in hardware, firmware, or software, or a combination thereof. The procedure 500 is shown as a set of blocks that specify operations performed by one or more devices as illustrated by the corresponding systems 200, 300, 400 of FIGS. 2-4 and are not necessarily limited to the orders shown for performing the operations by the respective blocks. Accordingly, the following discussion is arranged as including a description of the system and procedures in parallel.

Figure 2:
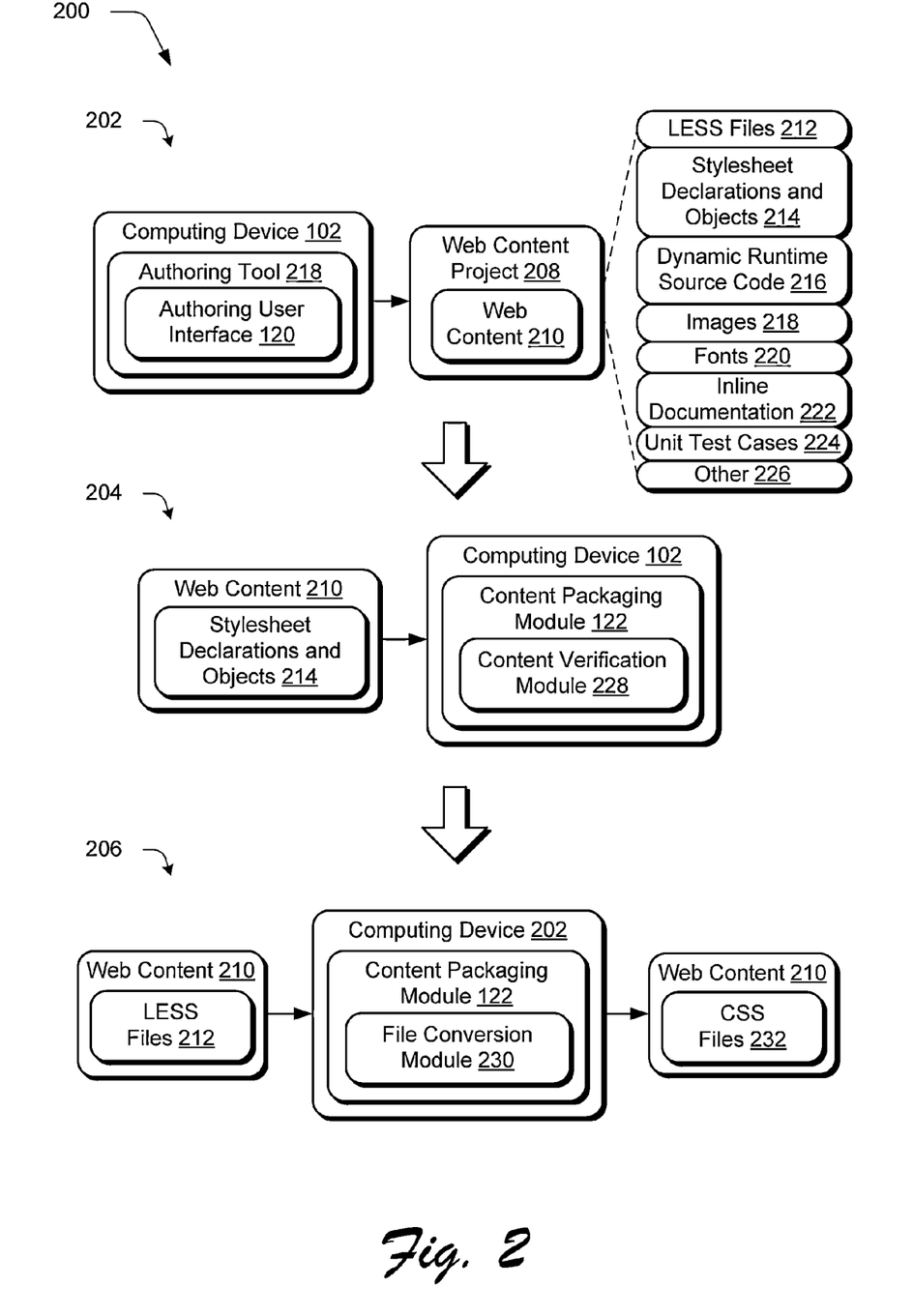
FIG. 2 depicts a system in an example implementation in which a web content project is developed and one or more techniques are performed to process the web content project into a content package.

FIG. 2 depicts a system 200 in an example implementation in which a web content project is developed and one or more techniques are performed to process the web content project into a content package. The system 200 is illustrated through the use of first, second, and third stages 202, 204, 206 in this example.

At the first stage 202, one or more inputs are received via an authoring tool of a computing device to compose a web content project (block 502). A developer, for instance, may interact with the authoring tool 218 to describe presentation semantics of a document, which may be expressed in a markup language such as XML. This may be performed in a variety of ways.

For example, the authoring tool 218 may be configured to support a dynamic stylesheet language, such as LESS, to generate a web content project 208 having web content 210. Therefore, instead of writing directly to a cascading style sheets (CSS) language directly, the authoring tool 218 may support the use of a variety of different functionality made available via the dynamic stylesheet language. This functionality may include mixins (e.g., which permit embedding of properties of a class into another class), variables and variable assignment, nesting (e.g., logical nesting in which the code blocks themselves are not nested, but rather selectors are nested to specify inheritance), operators and functions, and so on. Other examples are also contemplated in which the authorizing tool 218 is configured to accept one or more inputs to compose CSS directly.

As illustrated, the web content 210 may include a variety of different types of data, which may include a variety of different types of static content. Examples of this content include LESS files 212 as described above, stylesheet declarations and objects 214, dynamic runtime source code 216, may include images 218, fonts 220 (e.g., files of glyphs), inline documentation 222, unit test cases 224, and other 226 content. It should be readily apparent that portions of the data may be optionally included as part of the web content 210 of the web content project 208.

Regardless of how the web content 210 originated, the web content project 208 may then be processed into a content package automatically and without user intervention by a computing device (block 504). This may include use of a variety of different techniques responsive to a single input from a user to begin the processing, e.g., a command, gesture, voice command, and so on.

At the second stage 204, for instance, syntax of the web content project is verified (block 506). As described above, the web content 210 may include stylesheet declarations and objects 214. Accordingly, the content packaging module 122 may employ a content verification module 228 to check syntax, including type errors and so on. For example, declaratives (e.g., LESS/CSS declaratives) and objects (e.g., Javascript® or other dynamic runtime objects) may be linted and verified such that the declaratives and objects do not contain syntax errors or break defined styling rules of the stylesheet language.

At the third stage 206, one or more static files of the web content project are converted from the dynamic stylesheet language into instructions in accordance with Cascading Style Sheets (CSS) (block 508). As previously describes, LESS files 212 may be generated for use of a variety of functionality such as nesting, variables, mixins, and so on. However, LESS files 212 may be incompatible with browsers and other functionality (e.g., web-enabled applications) that are configured to consume web content 210. Accordingly, the content packaging module 122 may leverage a file conversion module 230 to convert the LESS files into CSS files 232 or other stylesheet language that is consumable by such functionality.

Figure 3:
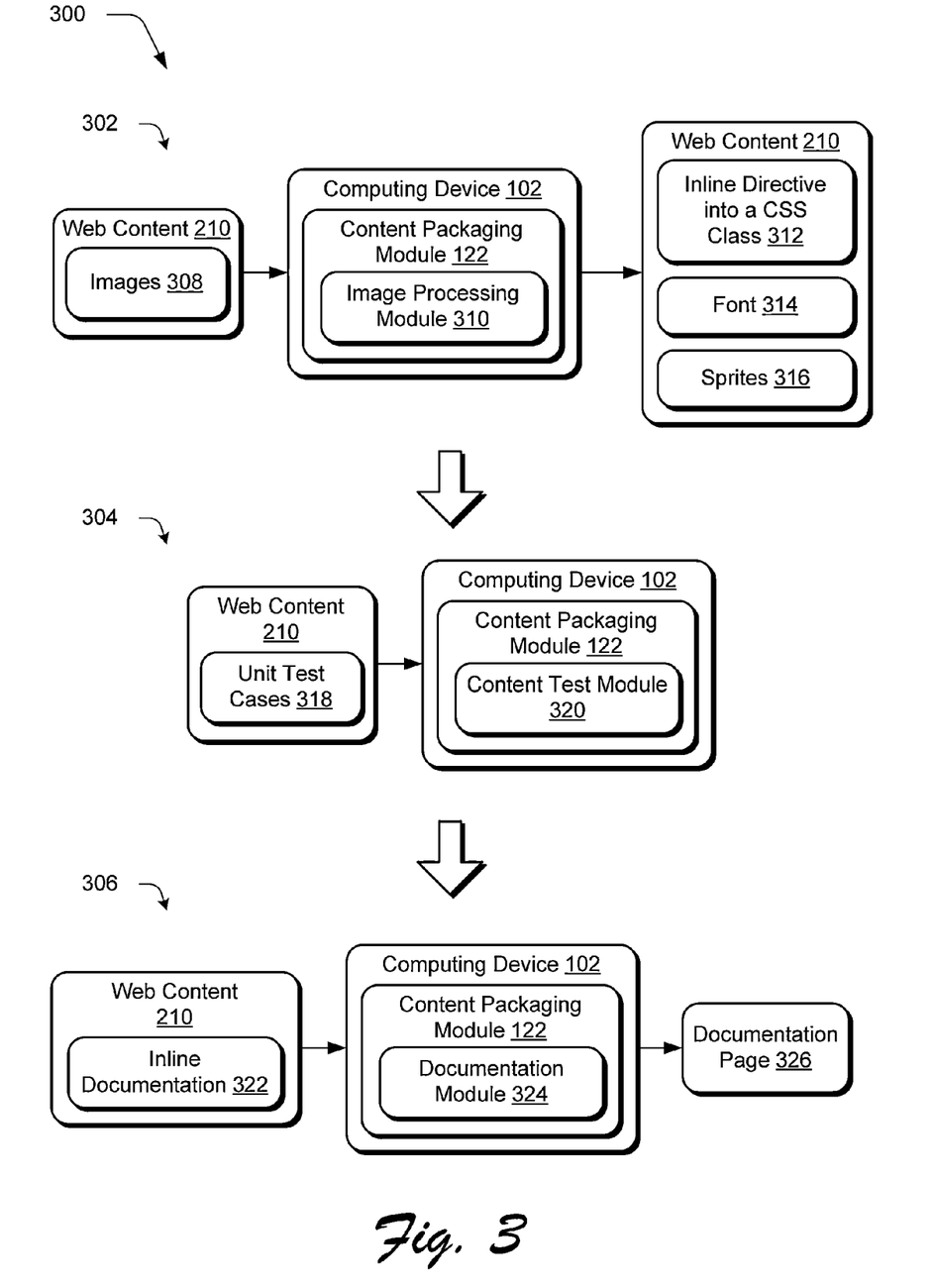
FIG. 3 depicts a system in an example implementation in which one or more additional techniques are performed to process the web content project into a content package.

FIG. 3 depicts a system 300 in an example implementation in which one or more additional techniques are performed to process the web content project into a content package. The system 300 is also illustrated through the use of first, second, and third stages 302, 304, 306 in this example. At the first stage 302, images in the web content are processed (block 510), if included. For example, the web content 210 may optionally include images 308, which may be configured in a variety of ways. Accordingly, the images 308 may be processed for inclusion as part of the web content project 210 in a corresponding variety of ways. This may include placement as an inline directive into a CSS class 312, such as by conversion into a format in accordance with Base 64 which is included as part of the CSS files. The images 308 may also be converted by the image processing module 310 into a glyph. This may include processing vector graphics (e.g., monochrome vector graphics) by the image processing module 310 into parts of a font file to support use in a manner that is similar to use of any other defined glyph, which is described in greater detail in the Vector Graphic Conversion Section below. The image processing module 310 may also support techniques involving sprites 316 such that a portion of a larger image is defined. In this way, that portion may be used such that a larger image may be leveraged for a variety of uses. A variety of other examples are also contemplated.

At the second stage 304, one or more unit tests are performed on the web content project (block 512). As previously described, the web content 210 may include unit test cases 318. These unit test cases may be specified manually as part of the web content. Accordingly, a content test module 320 may be employed to perform these tests to determine if functions operate as intended, e.g., to test variables, mathematical operations, and so on. If one of the tests fail, the content packaging module 122 may cease processing of the web content 210 used to form the content package 124.

At the third stage 306, documentation is extracted from one or more static files of the web content 210 to create one or more pages having the documentation (block 514). As illustrated, the web content 210 may include inline documentation 322 as part of the source code of the web content 210. This inline documentation may be parsed and applied by a documentation module 324 to a template to form one or more documentation pages 326 that include this inline documentation. In this way, the documentation page 326 may serve as a resource to locate documentation that describes functions included in the source code in a markup language page that may be included as part of the content package 124.

Figure 4:
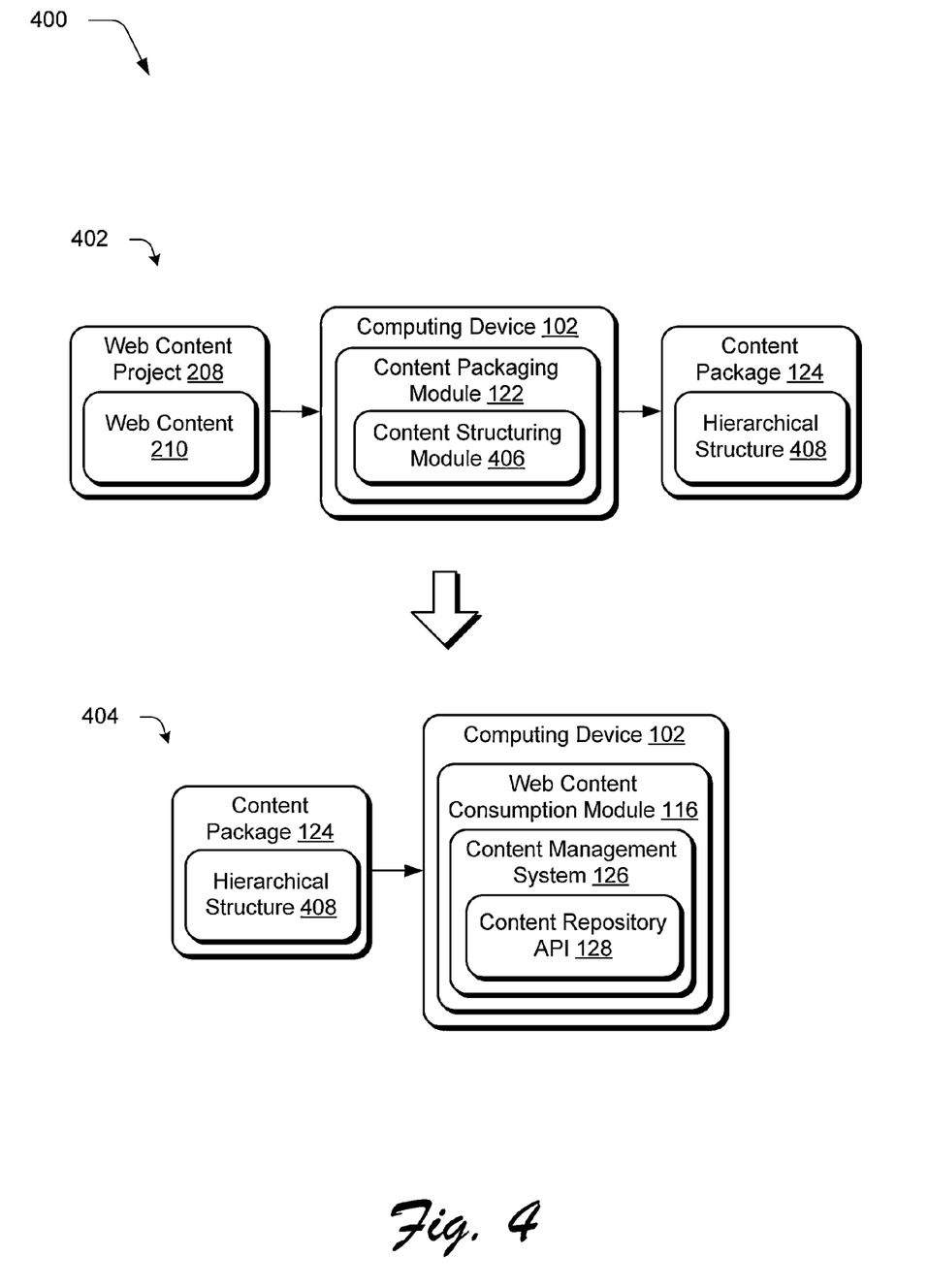
FIG. 4 depicts a system in an example implementation in which one or more additional techniques are performed to process the web content project into a content package.
Figure 5:
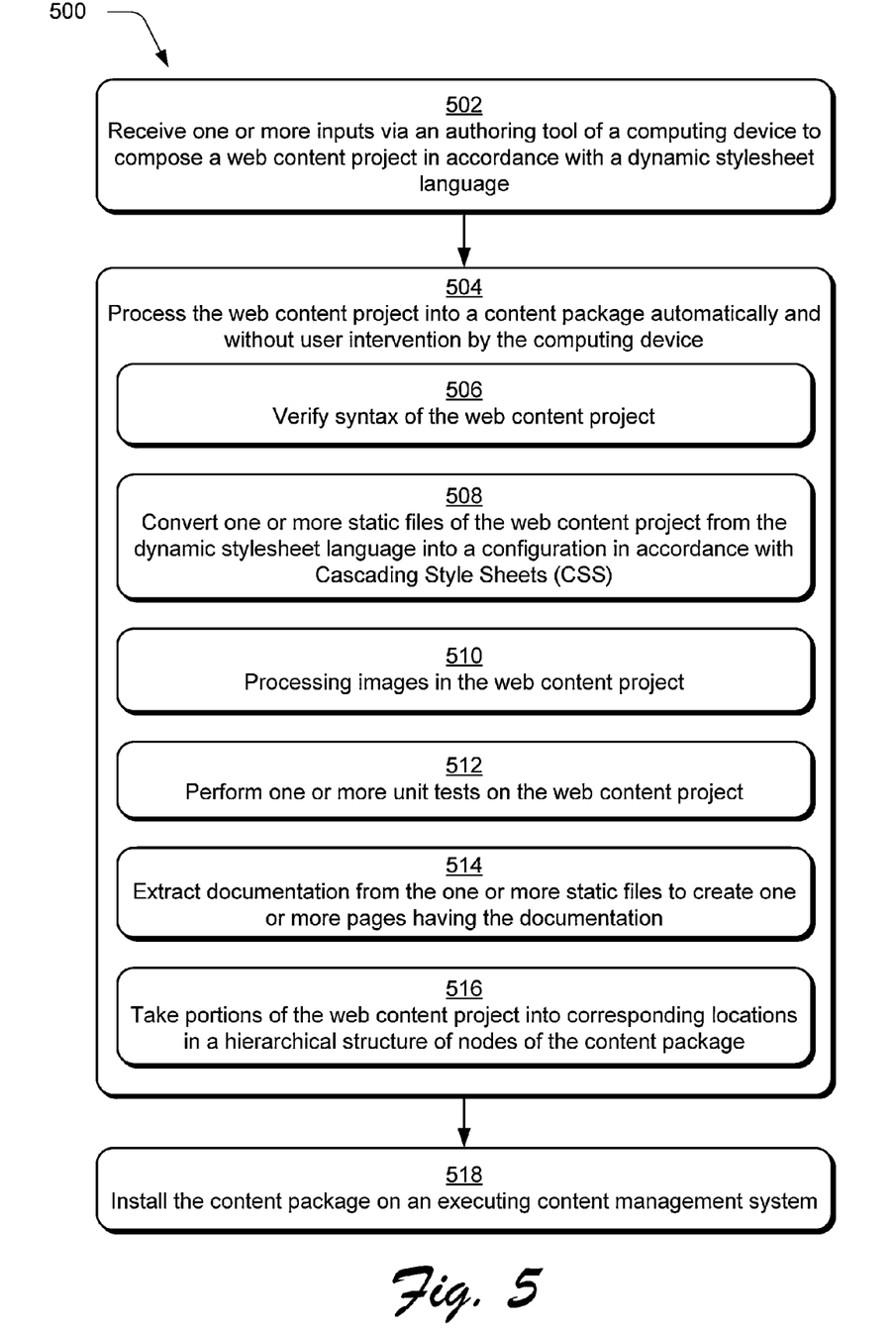
FIG. 5 is a flow diagram depicting a procedure in an example implementation in which a procedure is shown to generate a content package from one or more static files of a web content project.

FIG. 4 depicts a system 400 in an example implementation in which one or more further techniques are performed to process the web content project into a content package. The system 400 is also illustrated through the use of first and second stages 402, 404.

At the first stage 402, portions of the web content project are taking into corresponding location in a hierarchical structure of nodes of the content package (block 516). The content structuring module 406, for instance, may be employed to process a result of one or more of the previous operations of FIGS. 2 and 3. This processing may include placement into a hierarchical structure 408 that corresponds to a client library structure of the content management system 126. In this way, the content package 214 is formed that is compatible with a content repository API 128 such that the content management system 126 knows "where" to place portions of the content package 124 (i.e., which nodes) in a content repository maintained by the content management system 126.

Additional operations may also be performed by the content structuring module 406. This may include formation of reference files, e.g., to be compatible with a content repository API for Java® (JCR) through generation of "js.txt" and "css.txt" files that include line-by-line lists of files to be used for JavaScript® and CSS files, respectively.

At the second stage 404, the content package 420 is illustrated as being installed on an actively executing content management system 126. The installation may be performed depending on a developer's preference. The content package 124 as previously describe may include a hierarchical structure 408 that is understood via the content repository API 128, which is this instance is illustrated as being executed by a computing device 102 of the developer. Other examples are also contemplated, such as automatic upload of the content package 124 to the service provider 104 as part of the web content 112, output of a prompt to perform this upload, and so on.

Vector Graphic Conversion

The following discussion describes vector graphic conversion techniques that may be implemented utilizing corresponding systems and devices, as well as other systems and devices. Further, the systems and devices may also be utilized to perform other procedures and arrangements thereof. Aspects of the procedure of FIG. 9 may be implemented in hardware, firmware, or software, or a combination thereof. The procedure 900 is shown as a set of blocks that specify operations performed by one or more devices as illustrated by the corresponding systems 600, 700, 800 of FIGS. 6-8 and are not necessarily limited to the orders shown for performing the operations by the respective blocks. Accordingly, the following discussion is arranged as including a description of the system and procedures in parallel.

Figure 6:
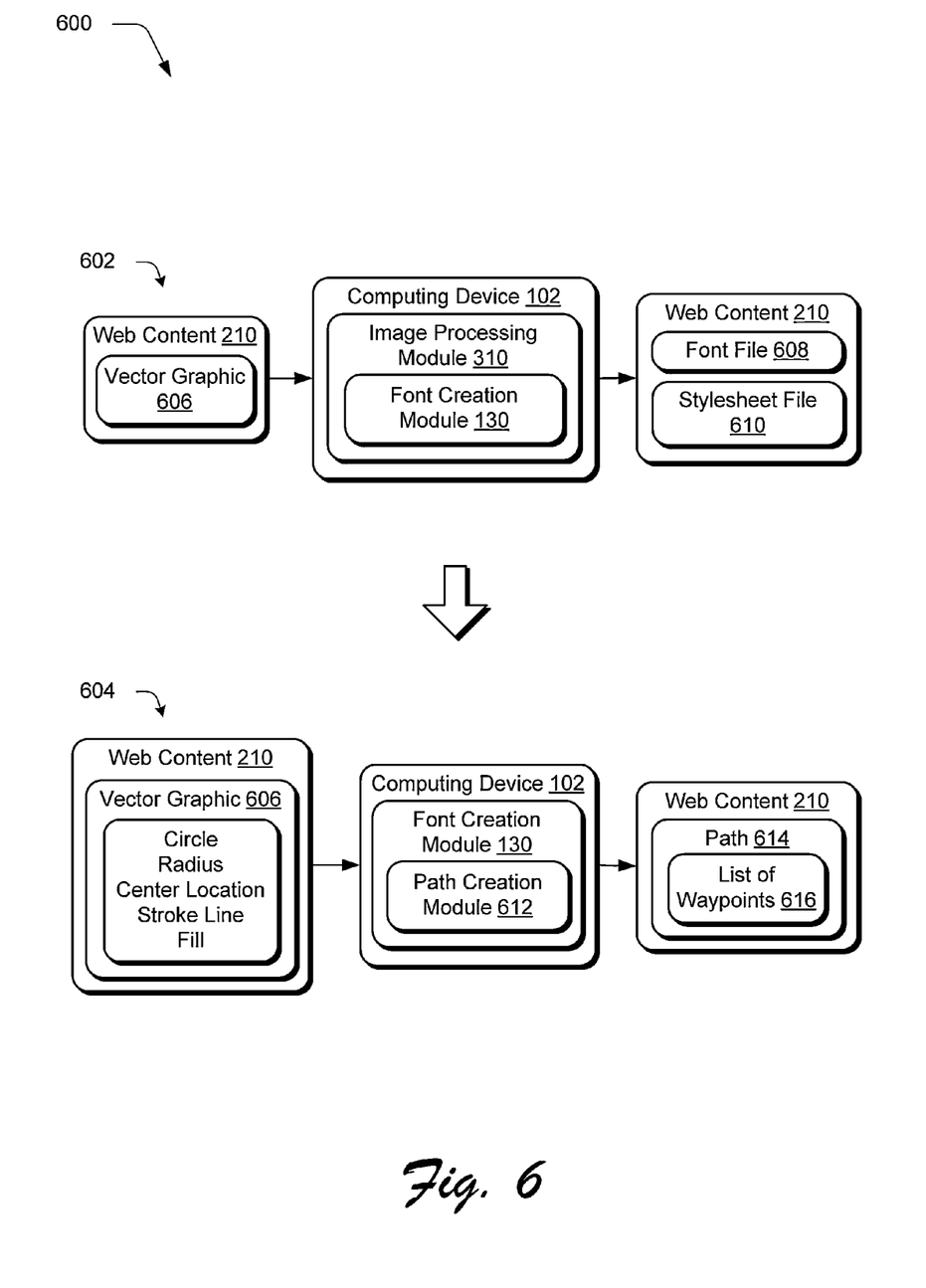
FIG. 6 depicts a system in an example implementation in which vector graphics of a web content project are converted into glyphs of a font file along with a corresponding stylesheet file.
Figure 9:
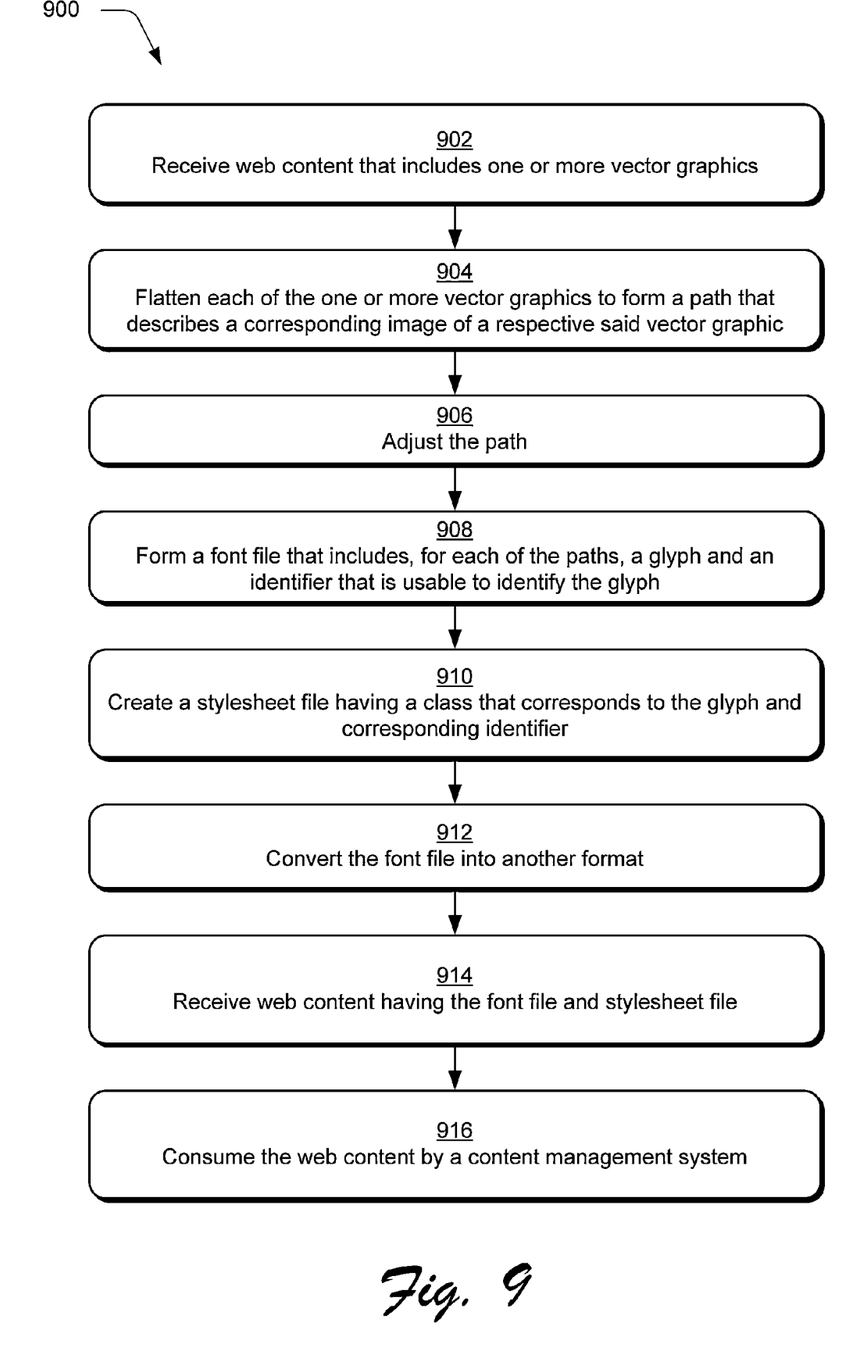
FIG. 9 is a flow diagram depicting a procedure in an example implementation in which a procedure is shown to convert vector graphics into fonts and a corresponding stylesheet.

FIG. 6 depicts a system 600 in an example implementation in which vector graphics of a web content project are converted into glyphs of a font file along with a corresponding stylesheet file. The system 600 is illustrated through the use of first and second stages 602, 604 in this example. As shown in the first stage 602, web content is received that includes one or more vector graphics (block 902), which may be used to provide scalable images that perform well for resizing. However, inclusion of multiple scalable images at multiple occasions as part of the web content 220 may consume significant portions of the available resources of the computing device 102 to render the images. Conventional techniques to address this potential concern often resulted in storage of multiple sizes of the same image, which could be stored as sprites as previously described.

In this example, a font creation module 130 may be utilized to identify vector graphics 606 in the web content 210, e.g., as part of the web content project described earlier. The font creation module 130 may then be utilized to flatten image information of the vector graphics to convert the vector graphic 606 into glyphs included in a font file 608 and a corresponding stylesheet file 610. This may be performed to create and compress multiple vector graphics into a single font file 608 and corresponding stylesheet 608 to enable the use within a web application, browser, and so on. In this way, a single file may be distributed that includes the images, which may increase efficiency by decreasing load time. An example of this process is described in greater detail as follows.

At the second stage 604, the font creation module 130 is illustrated as including a path creation module 612 that is representative of functionality to flatten each of the one or more vector graphics to form a path that describes a corresponding image of a respective vector graphic (block 904). For instance, the path creation module 612 may analyze a textual description of a vector graphic 606, such as for a circle as illustrated that describe a name of the type of image, radius, center location, stroke line, fill, and so on. This textual description may then be converted to a list of waypoints 616 that describe a path 614 that mimics the textual description, which be scaled in a manner similar to a glyph.

In this way, information stored to describe the vector graphic 606 may be modified by taking curves that describe the image (e.g., a scalar vector graphic format in which an image is described via a markup language such as XML) and create a path, thus "flattening" the description of the vector graphic 606. Thus, the list of waypoints 616 may be used to replace the textual description of the vector graphic 606. This process may continue for each vector graphic 606 identified in the web content 210, and the resulting paths may be saved one-by-one by the computing device 102.

Figure 7:
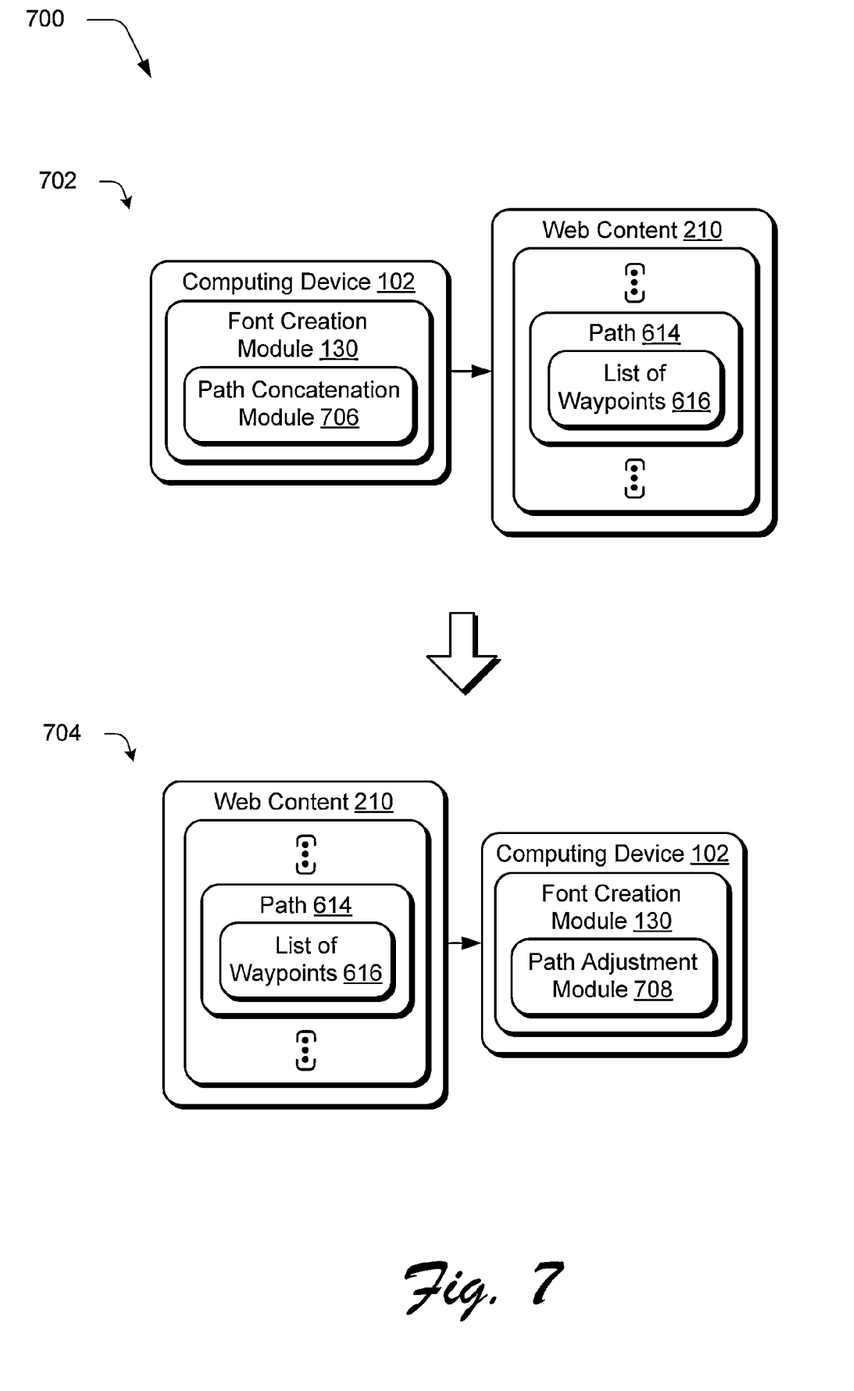
FIG. 7 depicts a system in an example implementation in which paths created by the system of FIG. 6 are further processed and adjusted.

FIG. 7 depicts a system 700 in an example implementation in which paths created by the system 600 of FIG. 6 are further processed and adjusted. This system 700 is also illustrated through the use of first and second stages 702, 704 in this example. As shown in the first stage 702, the font creation module 130 includes a path concatenation module 706 that is representative of functionality to collect the paths generated at the second stage 604 of the system 600 of FIG. 6 for a plurality of vector graphics 606 included in the web content 210. This may include formatting and ordering the list of waypoints of the paths 614 in accordance with a particular format, such as a scalar vector graphic (SVG) font file or other format.

As shown in the in the second stage 704, the font creation module 130 may also employ a path adjustment module 708 that is representative of functionality to adjust the list of waypoints 616 of the paths 614 in the web content 210. This adjustment may be performed to support a variety of functionality, such as to adjust a baseline and placement and resizing of the path 614 within grid. This may be performed such that an image corresponding to the path 614 complies with how a glyph is expected to function as part of the web content 210, e.g., for consistent alignment and placement as part of the web content. A variety of other adjustment are also contemplated. These adjustments may be performed automatically and without user intervention, and may be optional on the part of a developer of the web content 220.

Figure 8:
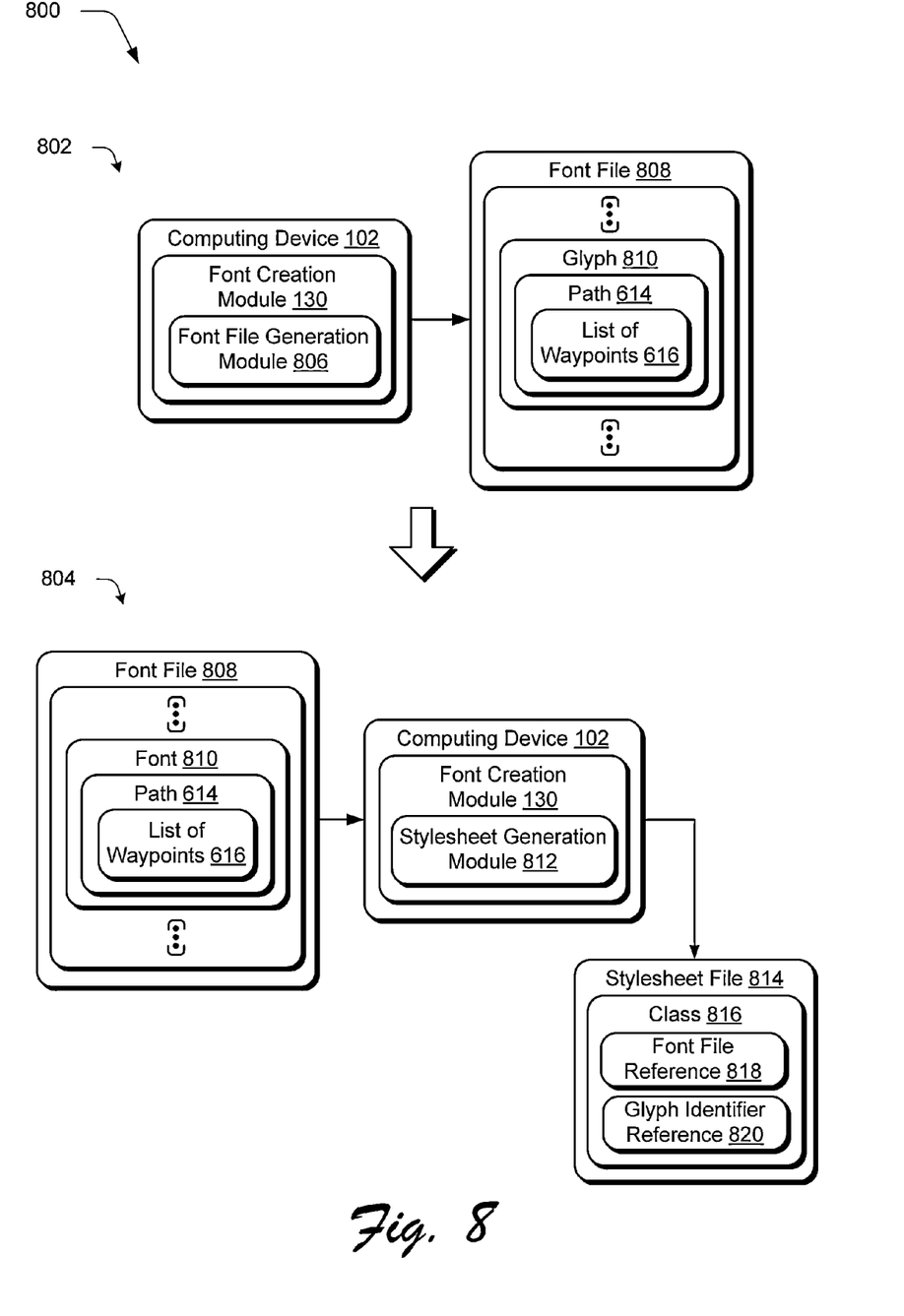
FIG. 8 depicts a system in an example implementation in which the font file and corresponding stylesheet of FIG. 6 are generated.

FIG. 8 depicts a system 800 in an example implementation in which the font file and corresponding stylesheet of FIG. 6 are generated. This system 800 is also illustrated through the use of first and second stages 802, 804 in this example. As shown in the first stage 802, the font creation module 130 includes a font file generation module 806 that is representative of functionality to form a font file 808. The font file 808 includes glyphs 810 that correspond to the previously described paths 614 formed as a list of waypoints 616 for the vector graphics 606 of the web content 210.

The font file 808 may be formed in a variety of ways. For example, the font file 808 may be formed such that, for each of the paths, a glyph and an identifier that is usable to identify the glyph is included in the file (block 908). Each glyph 810, for instance, may be assigned an identifier, such as a Unicode identifier such that the identifier is compatible with a wide range of applications. The Unicode identifier may be selected from a private space of identifiers, which is defined in the Unicode standard specification that may be leveraged for such an instance. In this way, the identifier may be used for the glyph 810 having the list of waypoints 616 that describe the path 614 in a manner similar to use of a traditional glyph.

At the second stage 804, the font creation module 130 is illustrated as including a stylesheet generation module 812 that is representative of functionality to create a stylesheet file 814 having a class that corresponds to the glphy and corresponding identifier (block 910). Instructions in the stylesheet file 814 may be configured in accordance with a variety of different formats, such as a Cascading Style Sheet (CSS) or other format.

The stylesheet generation module 812 may also be configured to create a class 816, and in the class include a font file reference 818 (e.g., a reference to the font file 808) and references to the glyph identifiers 820, e.g., the Unicode identifiers described above. This may support use of the class 818 in a markup language (HTML).

A variety of additional processing may be performed by the font creation module 130, such as to convert the font file into another format (block 912), such as from a scalar vector graphic (SVG) font format into other font formats like TrueType, OpenType, Web Open Font Format (WOFF), and so on to support differences in compatibility.

Thus, at this point the font file 808 and the stylesheet file 814 are ready for consumption. This may be performed in a variety of ways, such as included as part of the content package 124 for consumption via a content repository API 128 of a content management system 126 or otherwise, e.g., as single files and so on. Accordingly, a computing device 106 may receive web content 112 from a service provider 104 having the font file and stylesheet file (block 914). The web content is then consumed by a content management system (block 916) or consumed using other techniques.

Thus, these techniques may be employed to accept vector graphics 606 as an input. The vector graphics 606 may then be compressed by manipulating representation information. The compressed output may then be concatenated into a single representation file, which is transferred into glyphs by creating a curve information. Then, each single glyph may be adjusted through realignment to a baseline and hinted, e.g., provided a corresponding identifier. Each of the generated glyphs may then be transferred into a font files and be placed into a private use Unicode range. To support efficient use in web applications, browser, and so on, access information may be created in the form of a cascading stylesheet directive for each glyph as the Unicode letter. This directive may then be used in form of a CSS class to display the corresponding image.

Example System and Device

Figure 10:
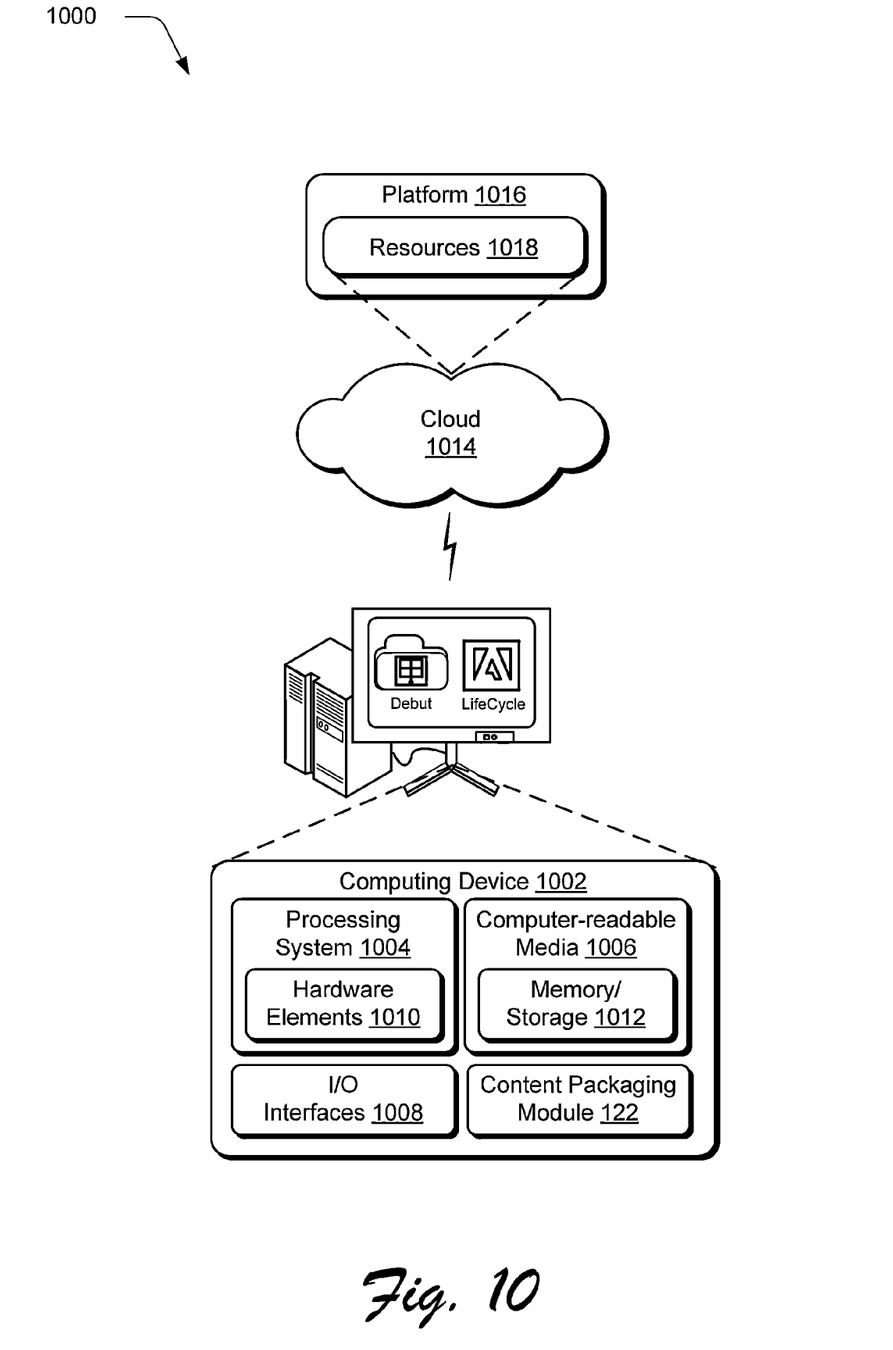
FIG. 10 illustrates an example system including various components of an example device that can be implemented as any type of computing device as described and/or utilize with reference to FIGS. 1-9 to implement embodiments of the techniques described herein.

FIG. 10 illustrates an example system generally at 1000 that includes an example computing device 1002 that is representative of one or more computing systems and/or devices that may implement the various techniques described herein. This is illustrated through inclusion of the content packaging module 122, which may be configured to package web content as described above. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A method implemented by one or more computing devices to convert one or more vector graphics into a font file, the method comprising:
  receiving web content that includes the one or more vector graphics;
  flattening each of the one or more vector graphics to form a path that describes a corresponding image of a respective said vector graphic, the flattening replacing a textual description of the respective said vector graphic with the path;
  forming the font file that includes, for each said path, a glyph and an identifier that is usable to identify the glyph; and
  creating a stylesheet file having a class that corresponds to the glyph and corresponding identifier.

2. A method as described in claim 1, wherein the path is described as a list of waypoints to describe the corresponding image of the respective said vector graphic.

3. A method as described in claim 1, wherein the one or more vector graphics describe the corresponding said image using a text description.

4. A method as described in claim 1, wherein the flattening is performed to form the path as the glyph through creation of curve information that describes the path.

5. A method as described in claim 1, wherein:
the web content includes a plurality of said vector graphics; and
the forming of the file further comprises concatenating a corresponding plurality of said glyphs into a single said font file.

6. A method as described in claim 1, further comprising adjusting the path and the forming is performed using the adjusted path.

7. A method as described in claim 6, wherein the adjusting includes adjusting a baseline of the path.

8. A method as described in claim 6, wherein the adjusting includes fitting the path to a grid.

9. A method as described in claim 1, wherein the identifier is a Unicode identifier.

10. A method as described in claim 9, wherein the Unicode identifier is configured as part of a private use Unicode range.

11. A method as described in claim 1, wherein the stylesheet file includes instructions in accordance with Cascading Style Sheets.

12. A method as described in claim 1, wherein the forming of the font file includes formatting the font file as a scalable vector graphic (SVG) font file.

13. A method as described in claim 12, further comprising converting the SVG font file into another format.

14. A system comprising:
one or more modules implemented at least partially in hardware, the one or more modules configured to perform operations including generating a font file from one or more vector graphics and a stylesheet file that describes the one or more vector graphics included in web content, the generating including:
converting each of the one or more vector graphics into a list of waypoints that describe a path corresponding to an image of a respective said vector graphic, the converting replacing a textual description of the respective said vector graphic with the list of waypoints;
forming the font file to include, for each said list of waypoints, a glyph and an identifier that is usable to identify the glyph; and
creating the stylesheet file having a class that corresponds to the glyph and corresponding identifier.

15. A system as described in claim 14, wherein
the web content includes a plurality of said vector graphics; and
the forming of the file further comprises concatenating a corresponding plurality of said glyphs into a single said font file.

16. A system as described in claim 14, further comprising adjusting the path and the forming is performed using the adjusted path, the adjusting including adjusting a baseline of the path or fitting the path to a grid.

17. A system as described in claim 14, wherein the stylesheet file is a Cascading Style Sheet and the font file is formatted in accordance with a scalable vector graphic (SVG) font file.

18. One or more non-transitory computer-readable storage media comprising instructions that are stored thereon that, responsive to execution by a computing device, causes the computing device to perform operations comprising:
receiving web content from a service provider via a network, the web content including a font file having a plurality of glyphs, each of the glyphs having a list of waypoints that are converted from one or more vector graphics and are associated with an identifier, the converting replacing a textual description of the respective one or more vector graphics with a list of waypoints; and
consuming the web content by a content management system.

19. One or more non-transitory computer-readable storage media as described in claim 18, wherein the web content is configured as a content package.

20. One or more non-transitory computer-readable storage media as described in claim 19, wherein the consuming of the content includes installation of the content package received via application programming interface for a content repository of a content management system.

* * * * *